Jan. 20, 1959    R. C. LONGFELLOW    2,869,213
GASKET SEALED CONCRETE PIPE FORM
Filed Dec. 2, 1955
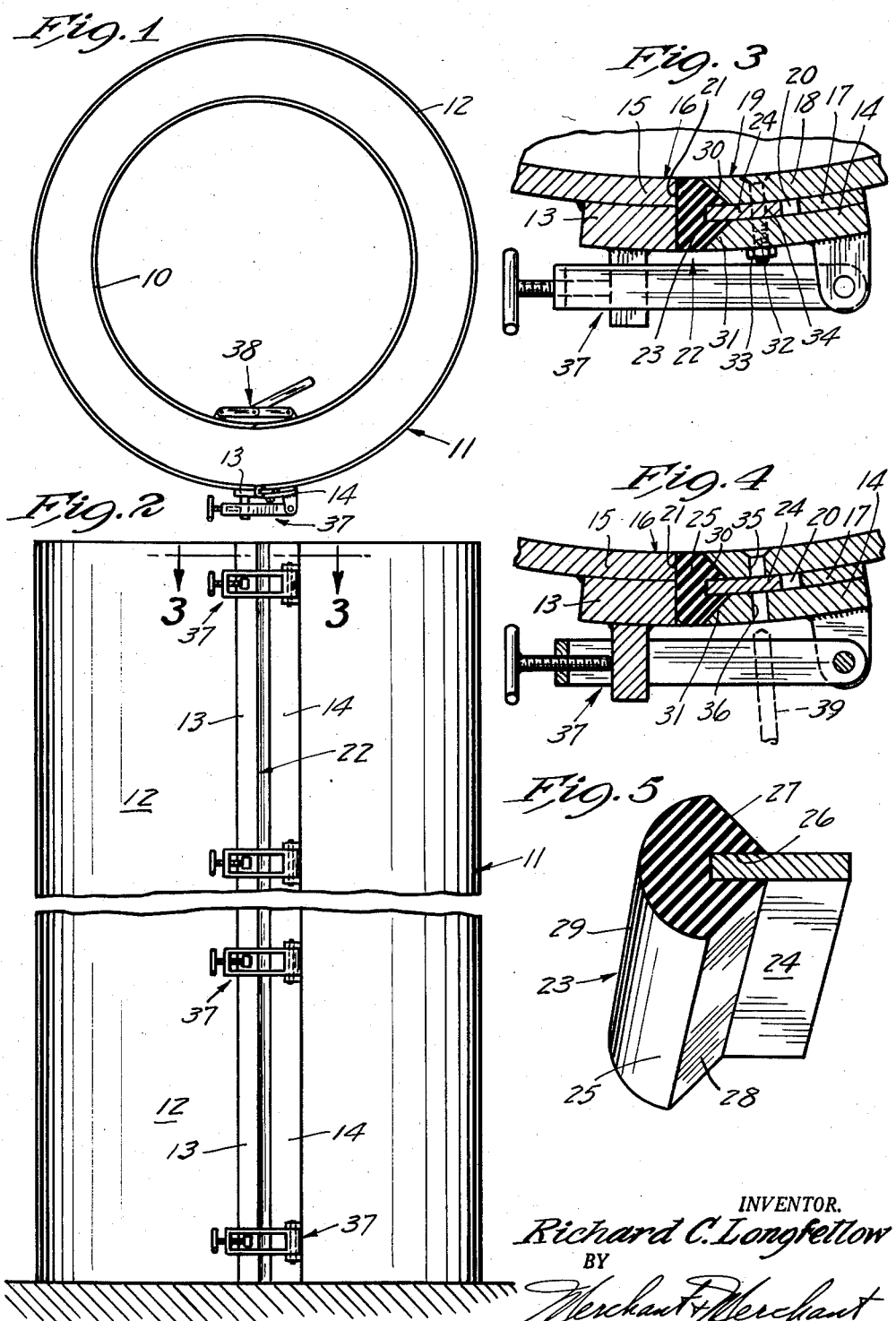
INVENTOR.
Richard C. Longfellow
BY
Merchant & Merchant
ATTORNEYS

United States Patent Office 2,869,213
Patented Jan. 20, 1959

2,869,213

GASKET SEALED CONCRETE PIPE FORM

Richard C. Longfellow, Elk River, Minn., assignor to The Cretex Companies, Inc., Elk River, Minn., a corporation of Minnesota Application December 2, 1955, Serial No. 550,685

4 Claims. (Cl. 25—127)

My invention relates to a novel and improved gasket sealed concrete form construction. In particular, my invention relates to form construction for the manufacture of concrete pipe.

Prior to my invention, it has been customary for most manufacturers of concrete pipe forms to use a metal to metal seal at the seam of the split annular forms. There is a serious disadvantage using a metal to metal seal because the concrete tends to build up along the seam and tremendous pressures are necessary in order to adequately close the form; and even in spite of the use of a very great pressure, there is some leakage at the seam; and the pipe is formed with unsightly streaks.

It is an object of my invention to provide a novel and improved concrete form construction having a gasket seal whereby the form may be adequately closed with relatively small pressures and any unsightly streaks on the outer surface of the finished concrete pipe are completely eliminated.

Another object of my invention is to provide a novel and improved gasket sealed concrete form construction wherein the gasket is simply yet securely anchored in position so that the gasket has a very long life.

Another object of my invention is to provide a novel and improved gasket sealed concrete form construction wherein the seal along the seam of the form is of simple construction and yet more effective than any similar form construction now known.

These and the other objectives and advantages of my invention will become apparent in the course of the following specification and claims, reference being had to the accompanying drawings wherein:

Fig. 1 is a view in top plan of my novel and improved concrete pipe form;

Fig. 2 is a view in side elevation of the structure shown in Fig. 1, with an intermediate portion thereof broken out;

Fig. 3 is an enlarged fragmentary view partially in horizontal section and partially in top plan as viewed on the line 3—3 of Fig. 2;

Fig. 4 is a view similar to Fig. 3 showing the drilling of the anchoring tongue in my method of pre-loading the gasket seal; and Fig. 5 is a fragmentary section in perspective of a preferred form of the gasket of my invention.

Referring more particularly to the drawings, wherein like parts will be indicated by the same numerals, I provide a concrete culvert, or pipe, form construction comprising a split annular inside form or core 10 and a split annular form member, indicated generally by the numeral 11. Form member 11 is generally referred to as the outside form or jacket and is disposed in concentric relationship with the inside form 10. Form member 11 comprises a split annular form ring 12 and two auxiliary metallic strips 13 and 14 which extend the length of the form member 11. Strip 13 is rigidly anchored, by welding or the like, to one edge 15 of ring 12 and defines therewith one of the lateral edges, indicated generally by the numeral 16, of the split form member 11. Auxiliary strip 14 is rigidly anchored, by welding or the like, to a coextensive spacer member 17 which in turn is rigidly anchored, by welding or the like, to the other lateral edge of ring 12, indicated generally by the numeral 18. Auxiliary strip 14 together with lateral edge 18 define the other lateral edge of form member 11, which is indicated generally by the numeral 19.

Auxiliary strip 14 is laterally outwardly spaced from the lateral edge 18 of ring 12 by virtue of connecting spacer member 17 to provide a longitudinally extended circumferentially outwardly opening slot 20 formed in the lateral edge 19 of form member 11. Slot 20 opens toward or faces the end surface 21 of lateral edge 16. Lateral edges 16 and 19 of split form member 11 are relatively movable with respect to each other and define a seam 22 therebetween.

I provide a gasket, indicated generally by the numeral 23, for effectively sealing the seam 22 when form member 11 is in a closed position. Gasket 23, in its preferred construction, comprises a longitudinally extended metallic flange or tongue 24 and a coextensive longitudinally extended resilient head portion 25 of rubber, neoprene or the like. Head portion 25 has a slot 26 formed therein which receives one edge of tongue 24 so that the latter is embedded in the head portion 25. The resilient head portion 25 of gasket 23 is vulcanized to the tongue 24 so that tongue 24 is integral therewith. It would be possible to substitute an integral rubber flange or tongue for the tongue 24 wherein tongue 24 and resilient head 25 would be formed in one piece of the same material. This latter construction of gasket 23 is equivalent to the preferred construction shown in Fig. 5, and would be somewhat less expensive; however, I believe that the metal tongue or flange 24 has many advantages over the aforementioned equivalent structure, wherein the flange 24 is formed integrally with and of the same material as head 25. Preferably, I form resilient head 25 with beveled edges adjacent tongue 24, or specifically, with a pair of oppositely disposed side wall portion 27 and 28 which converge toward and terminate at the adjacent surfaces of tongue 24. Specifically, side wall portions 27 and 28 converge at angles of 45°. Between the generally flat wall portions 27 and 28, resilient head 25 has an elongated arcuate, generally semicircular, outside wall surface.

Referring now particularly to Fig. 3, tongue 24 is disposed in slot 20 with converging side wall portions 27 and 28 of resilient head 25 seated against correspondingly converging walls 30 and 31 of slot 20. Walls 30 and 31 form the end surfaces of lateral edge 19; the former is at the end of lateral edge 18 of ring 12, and the latter is at the outer end of auxiliary strip 14; end surface 21 of lateral edge 16 and end surfaces 30 and 31 of lateral edge 19 form oppositely disposed gasket seats between which the gasket 23 is compressed in sealing relationship when form member 11 is in a closed operative position. The gasket seat formed by converging walls or end surfaces 30 and 31 need not be formed as specifically shown but might instead be flat to form a generally flat gasket seat at the end of lateral edge 19. However, as preferably shown, the V-notched gasket seat at lateral edge 19 defined by walls or end surfaces 30 and 31 receives the correspondingly converging wall portions 27 and 28 to thereby aid in holding gasket 23 in proper position.

I provide means for anchoring gasket 23 to the end of lateral edge 19 of form member 11 which comprise a plurality of normally vertically spaced horizontally disposed bolts 32 equipped with nuts 33. Each of the bolts 32 extend through an aperture 34 formed in the tongue 24 which is aligned with apertures 35 and 36 formed in the lateral edge 19 of form member 11 and intersecting the slot 20. Specifically, apertures 35 extend generally radially through ring 12 in longitudinally spaced relationship, and apertures 36 extend through auxiliary strip 14 each in alignment with one of the apertures 35.

I provide releasable locking means, indicated generally by the numeral 37, for drawing the lateral edges 16 and 19 of form member 11 together and for holding these lateral edges in closed relationship during the formation of a concrete culvert or pipe. I have shown closing and locking means 37 of the screw type; but any suitable closing or latching device might be substituted therefor. I provide a plurality of toggle-like closing and latching devices 38 for the inner form 10.

I provide a method for pre-loading the gasket seal 23 by inserting gasket 23 in position as follows. First, tongue 24 is inserted into slot 20. It should slide freely into slot 20 so that resilient head portion 25 seats snugly against the V-notch formed by converging wall portions 30 and 31. Next, form member 11 is closed by adjusting the closing and latching means 37. It is believed that the structure and adjustment of the closing and latching locks 37 is obvious from the drawings and need not be explained in detail. In closing form member 11, a minimum of compression is used to still give a sealing of form member 11. Specifically, closing and latching means or devices 37 are adjusted so that head portion 25 of gasket 23 is compressed 1/16 of an inch to 3/32 of an inch all along the length of seam 22. Next, the apertures 34 are drilled through tongue 24 of gasket 23, by the use of the drill bit 39 indicated in dotted lines in Fig. 4, using the lateral edge 19 of form member 11 as a template; that is, the existing holes 35 and 36 are used as guides in drilling holes 34 while the form member 11 is closed and gasket 23 is in its compressed state. Next, leaving form member 11 closed, the fastening members are inserted. Specifically, the headed bolts 32 are inserted through the aligned apertures or holes 34, 35 and 36, and are fastened with nuts 33. Form member 11 may now be opened and is ready for use.

This manner of preloading the gasket 23 ensures that gasket 23 is anchored in position in the compressed state it is in during actual use of the form, whereby, gasket 23 tends to assume its normal position during the actual use of the form which cuts down stress on the gasket 23 when it is in its compressed state. Further, my construction of gasket 23, and the method of pre-loading it, eliminates any chance of displacement of the resilient head portion 25 during repeated opening and closing of form member 11, which further eliminates stress on the juncture of head portion 25 and tongue 24. This insures a long life for gasket 23 and a structure which is far superior to any similar construction now known. Tongue 24 of gasket 23 would possibly act to resist compression of the resilient head 25 and proper seating thereof against the end of lateral edge 19; however, it is believed that by my method of pre-loading the gasket, these disadvantages of tongue 24 are eliminated and the tongue is pulled into the slot and anchored in the position it will assume during actual use of the form. In addition, in pre-loading, gasket 23 is forced to properly seat against converging end surfaces 30 and 31, and it is then anchored in this position.

It is clear that in the operation of my form construction, concrete is poured between inner form 10 and outer form member 11 when each are locked in closed relationship by their respective latching devices 38 and 37. Forms 10 and 11 may be easily removed from the finished culvert or pipe by releasing latching elements 37 and 38. When latching means or devices 37 are in closed relationship as shown in Fig. 3, the resilient gasket head portion 25 of gasket 23 is compressed between and in sealing relationship with the oppositely disposed ends of lateral edges 16 and 19 of form member 11. Gasket 23 is extremely effective and prevents any leakage all along the length of seam 22 and completely eliminates the unsightly streaks which have been common in concrete culverts and pipes heretofore.

My invention has been constructed and tested and found to accomplish all of the aforementioned objectives and advantages. It will be obvious to those skilled in the art that my invention may be modified by many substitutions and equivalents and that this disclosure is intended to be illustrative only; therefore, I intend to be limited solely by the scope of the appended claims.

What I claim is:

1. In a concrete form, an elongated split annular form member defining adjoining relatively movable lateral edges with a seam therebetween, one of said lateral edges having a longitudinally-extended outwardly opening slot formed therein which faces the other edge, a gasket comprising a resilient head portion extending generally the length of the form and disposed between said edges and an integral anchoring tongue disposed in said slot, means for anchoring said gasket to said form member, and locking means for holding said lateral edges in closed relationship with said resilient gasket head compressed therebetween in sealing relationship with said edges, whereby to prevent any leakage along the length of said seam.

2. In a concrete form, an elongated split annular form member defining adjoining relatively movable lateral edges with a seam therebetween, one of said lateral edges having a longitudinally-extending outwardly opening slot formed therein which faces the other edge, a gasket comprising a resilient head portion disposed between said edges and extending generally the length of said form member and a longitudinally-extended integral anchoring tongue disposed in said slot, said head portion having a side wall portion converging toward and terminating at the adjacent side wall surface of the tongue and adapted to seat against a correspondingly converging wall of the slot, a plurality of fastening members extending through said tongue and the slotted edge of said form member for anchoring said gasket to the slotted edge of said form member, and locking means for holding said lateral edges in closed relationship with said resilient gasket head compressed therebetween in sealing relationship with said edges, whereby to prevent any leakage along the length of said seam.

3. The structure defined in claim 2 in which said anchoring tongue comprises a longitudinally-extended metal strip embedded in said resilient head portion, said resilient head portion being vulcanized to said metal strip so that the latter is an integral part thereof.

4. In a concrete form, an elongated split annular form member defining adjoining relatively movable lateral edges with a seam therebetween, one of said lateral edges having a longitudinally-extending outwardly opening slot formed therein which faces the other edge, a gasket comprising a resilient head portion extending generally the length of the form and disposed between said edges and an integral anchoring tongue disposed in said slot, locking means for holding said lateral edges in closed relationship with said resilient gasket head compressed therebetween in sealing relationship with said edges, and rigid fastening members extending through said tongue and the edge of said form member having the slot formed therein for anchoring said gasket to the form; whereby, said gasket is capable of being pre-loaded by inserting said fastening members in position when said lateral edges are in closed relationship.

(References on following page)

References Cited in the file of this patent

UNITED STATES PATENTS

| | | |
|---|---|---|
| 772,845 | Stempel | Oct. 18, 1904 |
| 1,025,327 | Stanley | May 7, 1912 |
| 1,051,329 | Hibbard | Jan. 21, 1913 |
| 1,278,479 | Kellar | Sept. 10, 1918 |
| 1,837,092 | Almquist | Dec. 15, 1931 |
| 1,925,221 | Wotnoske | Sept. 5, 1933 |
| 2,502,789 | James | Apr. 4, 1940 |
| 2,303,416 | Woods | Dec. 1, 1942 |
| 2,322,546 | Sepin | June 22, 1943 |
| 2,453,223 | Henderson | Nov. 9, 1948 |
| 2,736,067 | Boschi | Feb. 28, 1956 |